(12) United States Patent
Kim

(10) Patent No.: US 6,507,369 B1
(45) Date of Patent: Jan. 14, 2003

(54) CAPTION DATA PROCESSING APPARATUS FOR DIGITAL TV

(75) Inventor: Myung Ja Kim, Kimchun (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/500,570

(22) Filed: Feb. 10, 2000

(30) Foreign Application Priority Data

Feb. 10, 1999 (KR) .............................................. 99-4735

(51) Int. Cl.7 .................................................. H04N 7/08
(52) U.S. Cl. ........................ 348/465; 348/468; 348/461
(58) Field of Search ............................... 348/465, 468, 348/461, 467, 473, 478, 466; 725/137, 136; H04N 7/08

(56) References Cited

U.S. PATENT DOCUMENTS

| | | | | |
|---|---|---|---|---|
| 6,018,369 A | * | 1/2000 | Patterson | 348/461 |
| 6,208,383 B1 | * | 3/2001 | Park | 348/468 |
| 6,239,843 B1 | * | 5/2001 | Gaudreau | 348/465 |
| 6,256,072 B1 | * | 7/2001 | Bae et al. | 348/568 |
| 6,262,775 B1 | * | 7/2001 | Kim | 348/465 |
| 6,281,934 B1 | * | 8/2001 | Nakatani | 348/465 |
| 6,373,526 B1 | * | 4/2002 | Kessler et al. | 348/468 |

OTHER PUBLICATIONS

EIA Standard, EIA–708–A, Nov. 1998.

* cited by examiner

Primary Examiner—John Miller
Assistant Examiner—Jean W. Désir
(74) Attorney, Agent, or Firm—Birch, Stewart, Kolasch & Birch, LLP

(57) ABSTRACT

The present invention relates to a caption data processing apparatus for a digital TV for processing caption data contained in a broadcast signal. In particular, the apparatus is capable of preventing an error occurred when the additional byte of a command or a text overlaps with a code of a Reset command or a DelayCancel command to be looked up, by storing additional byte length of all commands and texts contained in a caption data to a lookup table, further reading the caption data stream as much as the length of a corresponding command using the above values, and storing the data stream to a service input buffer. In addition, the size of the lookup table can be reduced by creating the lookup table according to the regularity of a caption code mapping of a digital TV, and accordingly the time taken in looking up a Reset command and a CancelDelay command can be reduced.

10 Claims, 4 Drawing Sheets

FIG. 3
CONVENTIONAL ART

| | | C | 0 | | | G | 0 | | | C | 1 | | | G | 1 | | |
|---|---|---|---|---|---|---|---|---|---|---|---|---|---|---|---|---|---|
| | b7-b4 | 0 | 1 | 2 | 3 | 4 | 5 | 6 | 7 | 8 | 9 | A | B | C | D | E | F |
| b3-b0 | 0 | NUL | EXT1 | SP | 0 | @ | P | ` | p | CW0 | SPA | NBS | ° | À | Ð | à | ð |
| | 1 | | | ! | 1 | A | Q | a | q | CW1 | SPC | ¡ | ± | Á | Ñ | á | ñ |
| | 2 | | | " | 2 | B | R | b | r | CW2 | SPL | ¢ | ² | Â | Ò | â | ò |
| | 3 | ETX | | # | 3 | C | S | c | s | CW3 | | £ | ³ | Ã | Ó | ã | ó |
| | 4 | | | $ | 4 | D | T | d | t | CW4 | | ¤ | ´ | Ä | Ô | ä | ô |
| | 5 | | | % | 5 | E | U | e | u | CW5 | | ¥ | µ | Å | Õ | å | õ |
| | 6 | | | & | 6 | F | V | f | v | CW6 | | ¦ | ¶ | Æ | Ö | æ | ö |
| | 7 | | | ' | 7 | G | W | g | w | CW7 | SWA | § | · | Ç | × | ç | ÷ |
| | 8 | BS | P16 | ( | 8 | H | X | h | x | CLW | DF0 | ¨ | | È | Ø | è | ø |
| | 9 | | | ) | 9 | I | Y | i | y | DSW | DF1 | © | ¹ | É | Ù | é | ù |
| | A | | | * | : | J | Z | j | z | HDW | DF2 | ª | ² | Ê | Ú | ê | ú |
| | B | | | + | ; | K | [ | k | { | TGW | DF3 | « | » | Ë | Û | ë | û |
| | C | FF | | , | < | L | \ | l | \| | DLW | DF4 | ¬ | ¼ | Ì | Ü | ì | ü |
| | D | CR | | - | = | M | ] | m | } | DLY | DF5 | - | ½ | Í | Ý | í | ý |
| | E | HCR | | . | > | N | ^ | n | ~ | DLC | DF6 | ® | ¾ | Î | Þ | î | þ |
| | F | | | / | ? | O | _ | o | ♪ | RST | DF7 | ¯ | ¿ | Ï | ß | ï | ÿ |
| | 0 | | | TSP | • | | | | | | | CC | | | | | |
| | 1 | | | NBTS P | ´ | | | | | | | | | | | | |
| | 2 | | | | ' | | | | | | | | | | | | |
| | 3 | | | | " | | | | | | | | | | | | |
| | 4 | | | | " | | | | | | | | | | | | |
| | 5 | | | ... | • | | | | | | | | | | | | |
| | 6 | | | | | | | ⅛ | | | | | | | | | |
| | 7 | | | | | | | ⅜ | | | | | | | | | |
| | 8 | | | | | | | ⅝ | | | | | | | | | |
| | 9 | | | TM | | | | ⅞ | | | | | | | | | |
| | A | | | Š | š | | | | \| | | | | | | | | |
| | B | | | | | | | | ┐ | | | | | | | | |
| | C | | | Œ | œ | | | | └ | | | | | | | | |
| | D | | | | SM | | | | ─ | | | | | | | | |
| | E | | | | | | | | ┘ | | | | | | | | |
| | F | | | | Ÿ | | | | ┌ | | | | | | | | |
| | | C | 2 | | | G | 2 | | | C | 3 | | | G | 3 | | |

| ADDRESS | COMMAND | BYTE LENGTH | ADDRESS | COMMAND | BYTE LENGTH |
|---|---|---|---|---|---|
| 0x00 | CW0 | 0 | 0x10 | SPA | 2 |
| 0x01 | CW1 | 0 | 0x11 | SPC | 3 |
| 0x02 | CW2 | 0 | 0x12 | SPL | 2 |
| 0x03 | CW3 | 0 | 0x13 |  | -3 |
| 0x04 | CW4 | 0 | 0x14 |  | -3 |
| 0x05 | CW5 | 0 | 0x15 |  | -3 |
| 0x06 | CW6 | 0 | 0x16 |  | -3 |
| 0x07 | CW7 | 0 | 0x17 | SWA | 4 |
| 0x08 | CLW | 1 | 0x18 | DF0 | 6 |
| 0x09 | DSW | 1 | 0x19 | DF1 | 6 |
| 0x0A | HDW | 1 | 0x1A | DF2 | 6 |
| 0x0B | TGW | 1 | 0x1B | DF3 | 6 |
| 0x0C | DLW | 1 | 0x1C | DF4 | 6 |
| 0x0D | DLY | 1 | 0x1D | DF5 | 6 |
| 0x0E | DLC | -2 | 0x1E | DF6 | 6 |
| 0x0F | RST | -1 | 0x1F | DF7 | 6 |

FIG. 6

| ADDRESS | EXTENDED CODE | BYTE LENGTH | ADDRESS | EXTENDED CODE | BYTE LENGTH |
|---|---|---|---|---|---|
| 0 | 0-ADDITIONAL BYTES | 0 | 10 | EXTENDED CHAR | 0 |
| 1 | 1-ADDITIONAL BYTES | 1 | 11 | EXTENDED CHAR | 0 |
| 2 | 2-ADDITIONAL BYTES | 2 | 12 | EXTENDED CHAR | 0 |
| 3 | 3-ADDITIONAL BYTES | 3 | 13 | EXTENDED CHAR | 0 |
| 4 | EXTENDED CHAR | 0 | 14 | EXTENDED CHAR | 0 |
| 5 | EXTENDED CHAR | 0 | 15 | EXTENDED CHAR | 0 |
| 6 | EXTENDED CHAR | 0 | 16 | 4-ADDITIONAL BYTES | 4 |
| 7 | EXTENDED CHAR | 0 | 17 | 5-ADDITIONAL BYTES | 5 |
| 8 | EXTENDED CHAR | 0 | 18 | VARIABLE LENGTH | -1 |
| 9 | EXTENDED CHAR | 0 | 19 | VARIABLE LENGTH | -1 |

CAPTION DATA PROCESSING APPARATUS FOR DIGITAL TV

BACKGROUND OF THE INVENTION

1. Field of the Invention

The present invention relates to a digital TV system and, in particular, to a caption data processing apparatus for a digital TV for looking up a caption data contained in a digital broadcast signal.

2. Description of the Prior Art

Recently, the development of a digital TV that receives digital broadcasting and displays it to users by digital broadcasting implemented by a broadcasting station, is in progress. Since the digital TV has a wider screen, a higher resolution and a high-speed data transfer rate compared to a conventional analog TV, a wider variety of caption services are possible. These caption services are properly used for a hearing-impaired person, or efficiently used in teaching or studying a foreign language.

The EIA(Electronic Industries Alliance) proposes various standard formats with respect to the caption specification of a digital TV. For example, the formation of a caption bit stream, the definition of various control commands required for processing a caption data, the code matching of a caption text and a caption command, etc. are proposed, which are well represented in the EIA-708-A(November 1998).

Such a digital TV provides the user with a caption service of more various functions than that provided on the conventional analog TV.

For instance, the digital TV has the caption transfer rate of 9600 bit/sec while the analog TV has the transfer rate of 960 bit/sec. This increase in transfer rate makes it possible to send caption data simultaneously using various languages.

Captions of the conventional analog TV are transmitted and then directly displayed on a screen by sending the caption data in real time by a caption provider.

However, the digital TV use the additional synchronization method in which caption data is processed some time later by the control of a caption decoder. That is, the transmitted caption data can be displayed on a screen after a certain time by the control of the caption decoder. In order to implement the above-described additional synchronization method, the digital TV includes a service input buffer 102 for storing caption data as shown in FIG. 1. That is, a caption data contained in a bit stream of the digital TV is parsed by a service number that the user wants, which parsed data contains various commands and texts with respect to captions. The digital TV caption decoder stores all parsed data to the service input buffer 102 in order to process these data.

The above additional synchronization method can be implemented by using three commands among various caption commands inputted to the service input buffer 102, that is, a Delay command, a DelayCancel command and a Reset command.

Herein, the Delay command is used in stopping data processing of the service input buffer 102 for a certain time. In addition, the DelayCancel command cancels the current state of stopping the processing of the service input buffer 102 for a certain time by the Delay command, and restarts data processing without delay. And, the Reset command newly initializes the caption service of the digital TV.

At this time, the DelayCancel and Reset commands of the three commands must be looked up in advance before going into the service input buffer 102. That is, the above commands are ones to be implemented as soon as they are looked up, the reason of which is because the implementation of these commands is delayed as much as the capacity of the buffer when the commands go into the service input buffer 102. If the three commands are stored in the service input buffer 102, data that must not be delayed or a service to be reset is continuously delayed until the commands are detected.

In order to exclude the above-described case, the shear of the service input buffer 102 includes a Reset & DelayCancel command detecting unit 101 in the conventional art.

According to the conventional art, all caption data(e.g., a caption data stream containing a caption command, a caption text, and a control command) is inputted to the Reset & DelayCancel command detecting unit 101, and the Reset & DelayCancel command detecting unit 101 detects a DelayCancel command and a Reset command from all the caption data.

If a DelayCancel command or a Reset command are detected from a caption data stream, a Reset operation or a DelayCancel operation corresponding to the above commands is directly executed and the caption data stream except for the two commands is stored in the service input buffer 102 to thereafter be processed sequentially.

FIG. 2 is a view showing a detailed construction of the Reset & DelayCancel command detecting unit 101 as shown in FIG. 1. In addition, FIG. 2 shows a caption data detecting unit defined by the EIA-708-A. As shown in FIG. 2, the Reset & DelayCancel detecting unit 101 includes a transmission register and two 1 byte comparators 202 and 203. The two 1 byte comparators detect a Reset command and a DelayCancel command, respectively, and output them without passing through the service input buffer 102. That is, since the Reset command and the DelayCancel command are 1 byte in size, respectively, the two commands can be detected by presetting the value(0x8) corresponding to the DelayCancel command and the value(0x8F) corresponding to the Reset command and then comparing these values with an inputted caption data stream.

FIG. 3 is a view showing a caption code set mapping of a digital TV as defined by the EIA-708-A.

All commands and texts are constructed of 256 code maps of ANSI X3,41 and ISO 2022 as shown in Figure. At this time, some commands and texts can have a length of more than 1 byte, In addition, there are commands and texts of which length is not set but variable. In this manner, commands and texts inputted to the Rest & DelayCancel command detecting unit have a length of more than 1 byte or a variable length, so that the above commands or texts of a variable length may overlap with a DelayCancel command or a Reset command to be looked up if the DelayCancel command and the Reset command are looked up by a simple byte comparison as shown in FIG. 2. For example, the DelayCancel command defined by the EIA-708-A has a code value of 0x8E, and the size thereof is 1 byte. In addition, a DF5 command defining a fifth window has a code value of 0x9D as shown in FIG. 3, and the size thereof is 7 byte so as to represent various characteristics(e.g., the number of windows, the size of a window, and the position of a window) of the window.

In the case that the above-mentioned DF5 command is inputted to the Reset & DelayCancel command detecting unit 101, when a DelayCancel command or a Reset command is to be detected simply by using a byte comparison, an error of recognizing 0x8E as a DelayCancel command occurs if there is 0x8E in the content of 7 byte forming the DF5 command. This error can also be occurred in the case that a text with a length of more than 1 byte is inputted to the Reset & DelayCancel command detecting unit 101.

SUMMARY OF THE INVENTION

Accordingly, it is an object of the present invention to provide a caption data processing apparatus for a digital TV for accurately looking up a DelayCancel command and a Reset command without an error in a caption decoder of a digital TV using a lookup table.

It is another object of the present invention to provide a caption data processing apparatus for a digital TV for rapidly looking up a DelayCancel command and a Reset command using a lookup table.

The apparatus according to the present invention includes a command lookup table in which information on the additional byte length of more than 1 byte when a caption command has a length of more than 1 byte and information on whether the caption command inputted to a command detecting unit is a Reset command or a DelayCancel command are mapped; a command detecting unit for detecting whether the caption command inputted using the command lookup table is a DelayCancel command or a Reset command when the caption command is inputted; an extended code lookup table in which information on the additional byte length of other texts or control commands except for the above caption commands is mapped; an extended code detecting unit for discriminating whether or not the length of an inputted text or a control command exceeds one byte when the text or control command is inputted and further reading the caption data stream as much as the additional byte length if it exceeds one byte; and a service input buffer for storing the caption commands and texts outputted from the command detecting unit and the extended code detecting unit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit scope of the invention will become apparent to those skilled in the art from this detailed description.

FIG. 3 is a view showing a code mapping according to the EIA-708-A;

FIG. 6 is a view showing an example of data mapping of an extended code lookup table in FIG. 4.

DETAILED DESCRIPTION OF THE PREFERRED EMBODIMENTS.

The preferred embodiments of the present invention will be described in detail with reference to the accompanying drawings.

The present invention is directed to looking up a Delay-Cancel command and a Reset command accurately and rapidly by using a command lookup table and an extended code lookup table. At this time, the above lookup tables have a byte length of a text or a control command to be compared, and are used to look up the DelayCancel command and Reset command using the byte length.

FIG. 3 is a view showing a caption code set mapping for a digital TV defined by the EIA-708-A.

CO, GO, C1 and G1 areas as shown in FIG. 3 designate Miscellaneous Control Codes, ASCII Printable Characters, Caption Command Codes and ISO 8859-1 LATIN-1 Character Set, respectively. In addition, the C2, G2, C3 and G3 areas designate Extended Control Code Set1, Extended Miscellaneous Characters, Extended Control Code Set2 and Future Expansion. Besides, the EIA708-A also defines a caption command belonging to the C1 area. For instance, a DF3 command is a command for creating a third window and defining a variety of parameters concerning to the window. The EIA-708-A also defines that the DF3 command has a size of 7 byte. In addition, it defines the size and other elements of the above-described Delay command, Reset command and DelayCancel command.

Hereinafter, in the present invention, a command corresponding to the C1 area of FIG. 3 is a caption command, and other commands except for the caption command are control commands.

Figure 1:
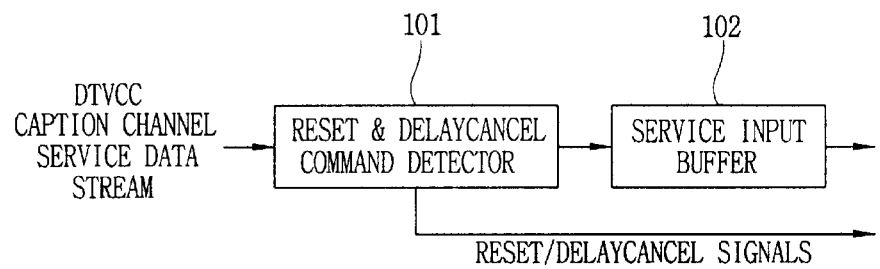
FIG. 1 is a view showing a construction of a conventional caption data processing apparatus.
Figure 2:
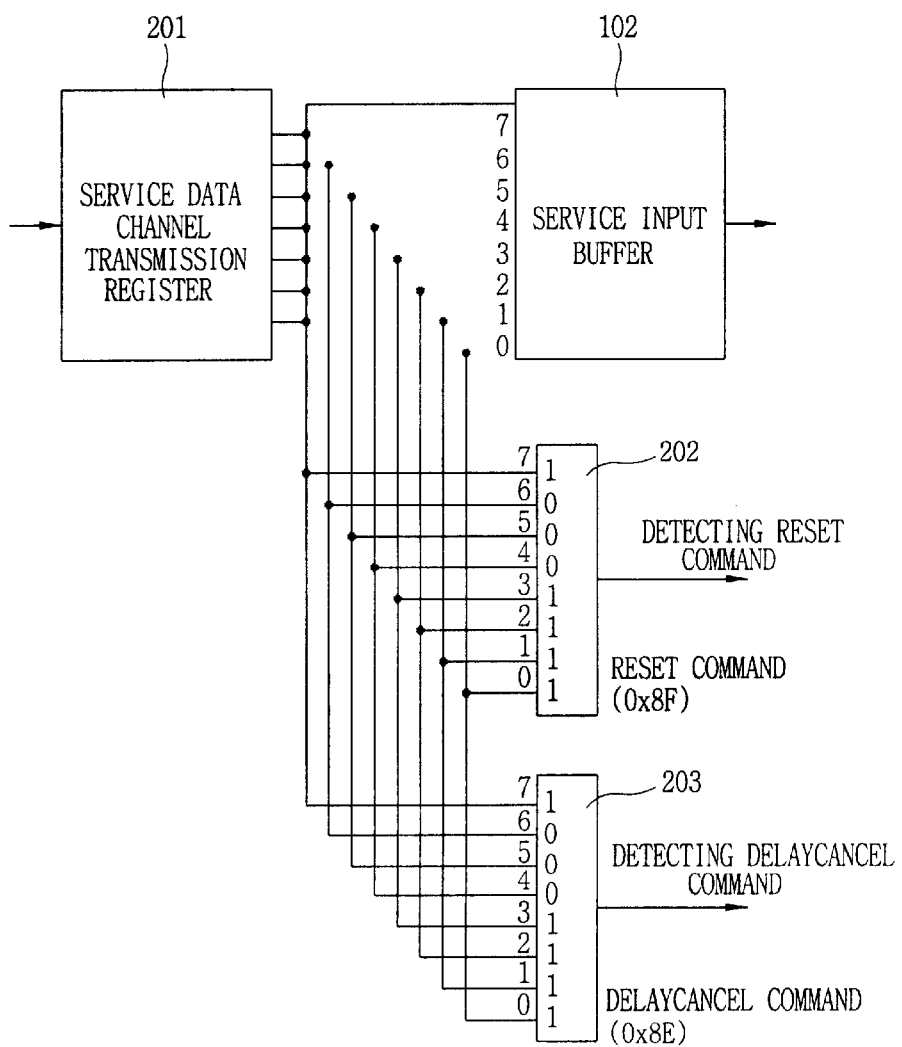
FIG. 2 is a view showing a detailed construction of a Reset & DelayCancel command detecting unit in Figure.
Figures 4, 5:
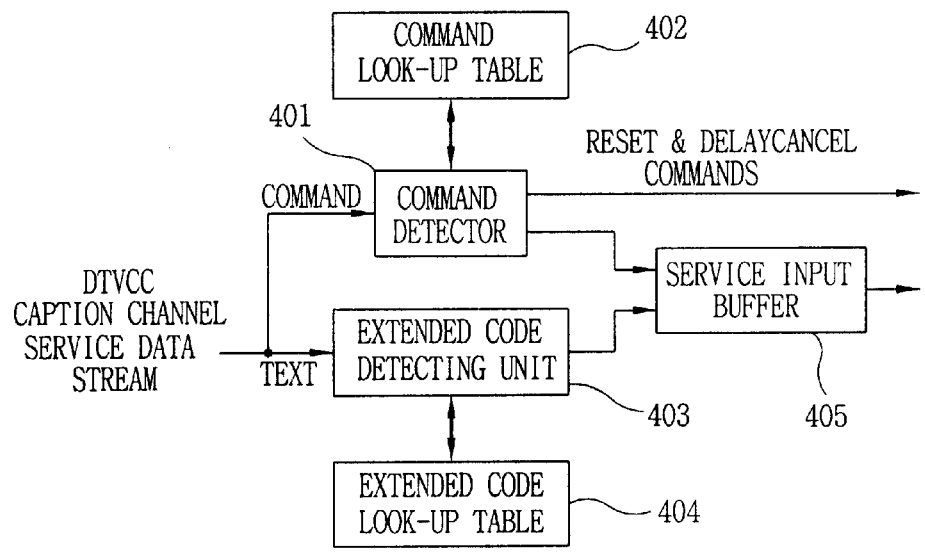
FIG. 4 is a view showing a construction of a caption data processing apparatus for a digital TV according to an embodiment of the present invention.
FIG. 5 is a view showing an example of data mapping of a command lookup table in FIG. 4.

FIG. 4 is a view showing a caption data processing apparatus for a digital TV according to an embodiment of the present invention.

If a caption data stream of the digital TV is inputted to a command detecting unit 401 or an extended code detecting unit 403, more specifically, the caption commands positioned at the C1 area of FIG. 3, that is, commands at a range of 0x80~0x9F, are inputted to the command detecting unit 401, and other commands or texts except for the caption commands positioned at the C1 area are inputted to the extended code detecting unit 403, the command detecting unit 401 detects a Reset command and a DelayCancel command using a command lookup table 402.

The command lookup table 402 has information on the additional byte length of a corresponding command if the command inputted to the command detecting unit 401 has a length of more than 1 byte, and information on whether the command inputted to the command detecting unit 401 is a Reset command or a DelayCancel command.

The command lookup table 402 according to the present invention will be explained in detail with reference to FIG. 5. The command lookup table 402 stores the additional byte length of a corresponding code inputted to the command detecting unit 401 and the value of the length matches the corresponding code one to one.

The category of byte length as shown in FIG. 5 will be described below.

0~6: represents the additional byte length of a corresponding command. If the corresponding command has a length of 7 byte, an excess length of 6 byte.

−1: represents that a DelayCancel command is inputted.

−2: represents that a Reset command is inputted.

−3: represents that there is no command corresponding to a code, in which case, codes 93 through 96 in the C1 area of FIG. 3 are inputted. At this time, they are directly inputted to the service input buffer 405.

The commands as shown in FIG. 5 represents commands positioned at the C1 area.

The contents of the address category of FIG. 5 are values which are obtained by subtracting 0x80 from code values of the commands at the C1 area.

For example, in the case a DF3 command is inputted to the command detecting unit 401, the operation of the command detecting unit is described. When the DF3 command has a code value of 0x9B, from which value 0x80 is subtracted, 0x1B is obtained to thereby become an index value of the command lookup table 402.

It is assumed that since the DF3 command has a size of 7 byte according to the EIA-708-A, the byte length category of the command lookup table of FIG. 5 will contain 6 byte.

The DF3 command inputted to the command detecting unit 401 will be described again in summary as follows. 0x1B obtained by subtracting 0x80 from 0x9B, the code value of the DF3 command, becomes an index value of the command lookup table of FIG. 5, and the additional byte length in FIG. 5 is referred to using this index value. Since the additional byte length corresponding to the index value, 0x1B, is 6 byte according to FIG. 5, 6 byte is further read from the caption data stream to thereby be stored in the service input buffer 405. In other words, since a simple byte comparison is not performed as shown in the conventional art, an error of recognizing other command or text as a Reset command or a DelayCancel command can be prevented.

In the case a Reset command is inputted to the command detecting unit 401, the index value of the command lookup table becomes 0x0F, the additional byte length category of FIG. 5 contains −1 as the result. As described above, if the additional byte length is −1, it means that a Reset command is inputted. Thus, the command detecting unit 401 detects that a Reset command is inputted and directly outputs the Reset command without passing though the service input buffer 405. Also, in the case that a CancelDelay command is inputted, the Reset command is directly outputted without passing though the service input buffer 405.

Hereinafter, the operation of the extended code detecting unit 403 and the extended code lookup table 404 will be described with reference to the accompanying drawings.

Commands or texts not positioned at a code range of 0x80~x09F in a caption data stream of FIG. 3(i.e., portions of FIG. 3 except for the C1 area) are inputted to the extended code detecting unit 403. The extended code detecting unit 403 further reads an inputted command or text as much as the additional byte length using the extended code lookup table 404 and stores them to the service input buffer 405.

When codes corresponding to the CO, GO and G1 areas of FIG. 3 are inputted to the extended code detecting unit 403, these codes are directly stored to the service input buffer 405. That is, if an inputted text or control command is not an extended code, it is directly stored to the service input buffer without reference to the extended code lookup table 404.

FIG. 6 is a view showing an extended lookup table according to an embodiments of the present invention.

The C2, C3, G2 and G3 areas of FIG. 3 are extended code areas, many of which are not defined yet so as to leave code areas that can be used as extended code areas later.

According to the EIA-708-A, EXT1(0x10) in the CO area must be used as a prefix in order to use extended code areas in the C2 area, G2 area, C3 area and G3 area of FIG. 3.

In other words, if 0x10 is attached in front of a command or a text, it means that the user should refer to the C2, G2, C3 and G3 areas of FIG. 3.

For instance, the codes representing TSP in the G2 area is 0x10 and 0x20.

According to the EIA-708-A, 0x00 through 0x07 in the C2 area has a size of 1 byte, 0x08 through 0x0F has a size of 2 byte, 0x10 through 0x17 has a size of 3 byte, and 0x18 through 0x1F has a size of 4 byte, respectively. The additional byte length obtained by subtracting 1 byte from the above byte length is 0 byte, 1 byte, 2 byte, 3 byte, 4 byte, and 5 byte, respectively.

In other words, the byte length corresponding to 0, 1, 2, 3, 16 and 17 in the address category of FIG. 6 showing the extended code lookup table represents 0 byte, 1 byte, 2 byte, 3 byte, 4 byte, and 5 byte as mentioned above.

In addition, according to the EIA-708-A, 0x90 through 0x9F in the C3 area have a variable length, which is represented as −1 in the extended lookup table of FIG. 6. That is, the variable length is represented by −1 corresponding to addresses 18 and 19 of FIG. 6.

Taking example by the case that 0x10 and 0x83 are inputted to the extended code detecting unit, the address category of FIG. 6 will be described.

Because a code of 0x10(EXT1) is inputted, the C2, C3, G2 and G3 areas of FIG. 3 are referred to. Then, since the next code to be inputted is 0x83, it is positioned at the C3 area.

The share obtained by dividing 0x83 by 8 is used as an index of the extended code lookup table. In this case, the share is 16. Thus, a 16-th address is looked up and the additional length of 4 byte according to the address is further read to thereby be stored to the service input buffer 405. The case that 0x10 and 0x30 are inputted to the extended code lookup table is described as another example. Since 0x10 is inputted as a prefix, the C2, G2, C3 and G3 areas of FIG. 3 are likewise referred to.

The next inputted code is 0x39, which divided by 8 is 7. It is assumed that the additional byte length corresponding to address 7 is 0 byte if the extended lookup table of FIG. 6 is referred to by using the share 7 as an index. Therefore, 0x30 is directly stored to the service input buffer 405 without further reading additional byte length. For reference, it is assumed that codes 0x10 and 0x39 represent ™ as shown in FIG. 3.

As seen from the above, the caption data processing apparatus for a digital TV according to the present invention has the following advantages by looking up a Reset command and a DelayCancel command using the lookup tables.

By storing the additional byte length of all commands and texts of a caption to the lookup table, further reading the caption data stream as much as the additional byte length of a corresponding command using the above values, and accordingly storing the additional byte length to the service input buffer 405, an error occurred when the additional byte length of a command or a text is the same as a Reset command or a DelayCancel command to be looked up can be prevented, thereby accurately detecting the Reset command or the DelayCancel command.

In addition, since the lookup tables are created using the regularity of a caption code map in a digital TV, wherein a caption command exists between 0x80 and 0x9F and extended codes have the same additional byte length, the size of the lookup tables can be reduced significantly compared to the conventional 256 code maps, and accordingly a command lookup can be implemented more rapidly.

The present invention can be implemented using hardware and/or software. Any existing computer programming language may be used in the implementation of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A caption data processing apparatus for a digital TV for receiving a broadcast signal including caption data, the apparatus comprises:

a command lookup table in which information on the additional byte length of more than 1 byte when a caption command has a length of more than 1 byte and information on whether the caption command inputted to a command detecting unit is a Reset command or a DelayCancel command are mapped;

a command detecting unit for detecting whether the caption command inputted using the command lookup table is a DelayCancel command or a Reset command when the caption command is inputted;

an extended code lookup table in which information on the additional byte length of other texts or control commands except for the above caption commands is mapped;

an extended code detecting unit for discriminating whether or not the length of an inputted text or a control command exceeds one byte when the text or control command is inputted and further reading the caption data stream as much as the additional byte length if it exceeds one byte; and a service input buffer for storing the caption command and texts outputted from the command detecting unit and the extended code detecting unit.

2. The apparatus of claim 1, wherein the command lookup table stores information on whether an inputted caption command is a Reset command or a DelayCancel command and additional byte length of codes corresponding to other commands except for a Reset command and a DelayCancel command.

3. The apparatus of claim 2, wherein the command detecting unit finds an index value of the command lookup table by subtracting a reference code value from a code value corresponding to an inputted caption command when the caption command is inputted.

4. The apparatus of claim 3, wherein the command detecting unit detects a Reset command or a DelayCancel command using information on whether the inputted caption command that is stored in the command lookup table is a Reset command or a DelayCancel command.

5. The apparatus of claim 3, wherein the reference code value subtracted by the command detecting unit is 80.

6. The apparatus of claim 4, wherein the command detecting unit does not output the inputted caption command to a service input buffer if the command is discriminated as a Reset command or a DelayCancel command.

7. The apparatus of claim 1, wherein the extended code lookup table stores additional byte length of a caption text or a control command corresponding to an extended code among caption texts or control commands that are inputted to the extended code detecting unit.

8. The apparatus of claim 1, wherein the extended code detecting unit directly stores the inputted control command or text to the service input buffer if the inputted control command or text is not an extended code.

9. The apparatus of claim 1, wherein the command detecting unit finds an index value of the command lookup table by subtracting a reference code value from a code value corresponding to an inputted caption command when the caption command is inputted.

10. The apparatus of claim 9, wherein the reference code value subtracted by the command detecting unit is 80.

* * * * *